United States Patent Office 3,248,248
Patented Apr. 26, 1966

3,248,248
LIGHT STABLE POLYMER COMPOSITION
Aubert Y. Coran and Constantine E. Anagnostopoulos, Charleston, W. Va., assignors to Monsanto Company, a corporation of Delaware
No Drawing. Filed Apr. 20, 1962, Ser. No. 188,975
7 Claims. (Cl. 106—181)

This application is a continuation-in-part of our copending application Serial No. 81,279, filed January 9, 1961, and now abandoned.

The present invention relates to improved organic materials and more particularly deals with highly polymeric substances such as are employed in the manufacture of molding and extruding compositions, films, sheets, textiles, papers, surface or coating compositions, impregnating agents, solid foams, rubbers, etc. More particularly this invention relates to compositions comprising such highly polymeric substances in combination with an adjuvant which has the property of stabilizing the properties of the polymer against the degradative effects of ultraviolet light.

In accordance with this invention it has been found that the properties of a polymer selected from the class consisting of natural and synthetic, linear and cross-linked polymers are improved in incorporating therein a stabilizing amount of a compound of the formula (I)
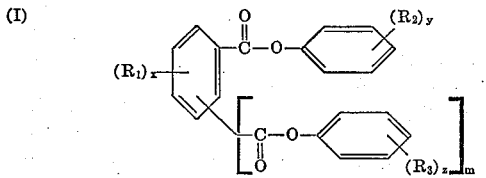

wherein $m$ is an integer of from 1 to 5, $x$ is an integer of from 0 to 4, provided that the sum of $m+x$ is less than 6, $R_1$ is a halogen atom such as chlorine or bromine, an alkyl radical having from 1 to 12 carbon atoms or an alkoxy radical having from 1 to 12 carbon atoms. $R_2$ and $R_3$ are selected from the group consisting of alkoxy radicals having from 1 to 24 carbon atoms and alkyl radicals having from 4 to 24 carbon atoms, and $y$ and $z$ are integers of from 1 to 4 with the proviso that at least one of the ortho positions on each of the phenyl rings is unsubstituted.

The $R_1$ radical in the above structure can be the straight or branched alkyl chain, e.g., methyl, ethyl, n-propyl, isopropyl, n-butyl, isobutyl, sec. butyl, t-butyl, n-amyl, isoamyl, n-hexyl, isohexyl, n-heptyl, isoheptyl, n-octyl, isooctyl, 2-ethylhexyl, n-nonyl, isononyl, undecyl, dodecyl, etc., or the corresponding alkoxy radicals. Where $x$ is an integer greater than 1, then the $R_1$ radicals can be the same or different alkyl or alkoxy radicals, the same or different halogen atoms or a combination of alkyl or alkoxy radicals and halogen atoms.

The $R_2$ and $R_3$ radicals can be straight or branched chain alkyl radicals having from 4 to 24 carbon atoms or alkoxy radicals having up to 24 carbon atoms. Illustrative examples of such alkyl radicals are: n-butyl, isobutyl, sec.-butyl, t-butyl, n-amyl, isoamyl, n-hexyl, isohexyl, 2-ethylheptyl, 2-ethylhexyl, octyl, isooctyl, 2-octyl, isononyl, decyl, isodecyl, lauryl, tetradecyl, pentadecyl, hexadecyl, heptadecyl, octadecyl, eicosyl, heneicosyl, docosyl, tricosyl, tetracosyl, etc.

Illustrative examples of said alkoxy radicals are: methoxy, ethoxy, propoxy, isopropoxy, n-butoxy, t-butoxy, pentoxy, isopentoxy, hexoxy, isohexoxy, heptoxy, isoheptoxy, 2-ethylhexoxy, octoxy, isooctoxy, nonoxy, decoxy, undecoxy, dodecoxy, lauroxy, tridecoxy, tetradecoxy, pentadecoxy, hexadecoxy, heptdecoxy, octadecoxy, nonadecoxy, tricosyloxy, tetracosyloxy, etc. Where the integers $y$ and $z$ are greater than one, then the $R_2$ and $R_3$ radicals respectively, can be the same or different alkyl radicals, the same or different alkoxy radicals or a combination of alkyl radicals and alkoxy radicals.

Illustrative examples of specific compounds contemplated by the foregoing formula are:

Bis(4-methoxyphenyl) phthalate
Bis(4-t-butylphenyl) phthalate
Bis(2-ethoxy-4-t-butylphenyl) isophthalate
Bis[4(1,1,3,3-tetramethylbutyl)phenyl] phthalate
Bis(2,4-di-n-amylphenyl) terephthalate
Bis(4-isodecylphenyl) isophthalate
Bis[3(1,1-dimethyloctyl)phenyl] isophthalate
Bis(2,3,4,5-tetramethoxyphenyl) terephthalate
Bis(3-octoxyphenyl) terephthalate
Bis(2,4-di-n-hexylphenyl) terephthalate
Bis(2-methoxy-4-t-butylphenyl) isophthalate
Bis(3-isopropoxyphenyl) isophthalate
Bis(4-t-butylphenyl) 3,4-dicholorphthalate
Bis(4-t-butylphenyl) 4-octadecoxyisophthalate
Bis[4(1,1,3,3-tetramethylbutyl)phenyl] terephthalate
Bis(4-t-butylphenyl) 4-bromoisophthalate
Bis(4-tetracosylphenyl) isophthalate
Bis[4(2-ethylhexyl)phenyl] 3,4,5,6-tetrachlorophthalate
Bis(4-octadecylphenyl) isophthalate
Bis(2,3,4-tridecylphenyl) isophthalate
Bis(4-t-butylphenyl) 4,6-di-t-butylisophthalate
Bis(3-butoxyphenyl) 6-octadecylisophthalate
Bis(4-ethoxyphenyl) 6-dodecylisophthalate
Bis[3(1-ethyl-1-methylpentyl)phenyl] 6-hexadecyloxyisophthalate
[4(1,1,3,3-tetramethylbutyl)phenyl] (2,3,4,5-tetramethylphenyl) isophthalate
(4-t-butylphenyl) (4-methylphenyl) isophthalate
Tris(4-t-butylphenyl) trimellitate
Tris[4(1,1,3,3-tetramethylbutyl)phenyl] trimellitate
Tris(3-nonylphenyl) trimesate
Tris(3,4-diisoamylphenyl) trimesate
Tris(4-hexadecylphenyl) trimellitate
Tris(4-octadecylphenyl) trimesate
Tris(3-isobutoxyphenyl) trimesate
Tris(4-t-butylphenyl) hemimellitate
Tris[4(1,1,3,3-tetramethylbutyl)phenyl] hemimellitate
Tris(3-isopropyloxyphenyl) trimesate
Tris(2-n-butylphenyl) trimesate
(4-t-butylphenyl) bis(3-isopropoxyphenyl) trimesate
Tetra(4-t-butylphenyl) prehnitate
Tetra[4(1,1-dimethylpropyl)phenyl] prehnitate
Tetra[4(1,1-dimethyloctyl)phenyl] prehnitate
Tetra(4-t-butylphenyl) mellophanate
Tetra(3-octadecycloxyphenyl) mellophanate
Tetra[4(1,1,3,3-tetramethylbutyl)phenyl] pyromellitate
Tetra(4-t-butylphenyl) pyromellitate
Bis[4(1,1,3,3-tetramethylbutyl)phenyl] bis(4-t-butylphenyl) pyromellitate Penta(4-t-butylphenyl) benzenepentacarboxylate
Penta[4(1,1,3,3-tetramethylbutyl)phenyl] benzenepentacarboxylate
Penta(4-ethoxy) benzenepentacarboxylate
Hexa(4-t-butylphenyl) mellitate
Hexa[4(1,1,3,3-tetramethylbutyl)phenyl] mellitate A preferred group of compounds are those of the following formula:

(II) 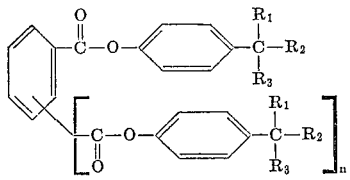

wherein $n$ is an integer of from 1 to 2, provided that the carboxyl groups are on non-adjacent ring positions; $R_1$, $R_2$ and $R_3$ are alkyl radicals having from 1 to 21 carbon atoms; and the sum of $R_1+R_2+R_3$ is up to 23 carbon atoms.

Typical examples of this preferred group are:

Bis(4-t-butylphenyl) isophthalate
Bis[4(1,1,3,3-tetramethylbutyl)phenyl] isophthalate
Tris[4(1,1,3,3-tetramethylbutyl)phenyl] isophthalate The branched alkylphenyl diesters of isophthalic acid, terephthalic and trimesic acid, wherein the alkylphenyl group is obtained by the alkylation of phenol with propylene polymers having from 6 to 24 carbon atoms or butylene polymers having from 8 to 24 carbon atoms, such as propylene dimer, propylene trimer, propylene tetramer, propylene pentamer, propylene octamer, butylene dimer, butylene trimer, butylene tetramer, etc. are especially preferred for the purposes of this invention.

The alkylphenols, which are derived from propylene polymers having from 6 to 24 carbon atoms and are further characterized by a para to ortho ratio of at least 4 para to 1 ortho, are a particularly preferred class of alkylphenols to be used in the preparation of the compounds of this invention. The propylene polymers which are used in the preparation of these phenols are available commercially and in general, boil within the range of 115° C. to 350° C.

The aromatic esters of this invention, hereinafter referred to as "the aromatic esters," can be prepared by any method well known to those skilled in the art. One method which can be employed involves the reaction of a halide of an aromatic acid, such as orthophthalic, isophthalic, terephthalic, trimellitic, pyromellitic, or benzenepentacarboxylic acid, etc., with a substituted phenol, e.g., 4-tert.-butylphenol, 3-ethoxyphenol, 2-methoxy-3-n-hexylphenol, a $C_9$-alkylphenol wherein the alkyl group is derived from propylene trimer, etc.

As hereinbefore disclosed, the polymeric materials which are modified by the aromatic esters are natural and synthetic, linear and cross-linked polymers, which are subject to ultraviolet light deterioration.

Fibrous cellulosic products are prime examples of the natural polymeric materials which are advantageously modified by the aromatic esters. This includes products made of cotton, linen regenerated cellulose, kapok, hemp, wood and wood pulp, e.g., textiles, twines, paper, cardboard, pressed board, batting wood flour, sawdust, etc. Another group of natural polymers of carbohydrate origin includes the starches such as those derived from corn, barely, potato and cassava. Another class of natural polymers with which the aromatic esters are beneficially used are the natural gums, e.g., agar, gum arabic, psyllium seed, tragacanth and gum karaya. Natural rubber is also included.

Synthetic polymeric materials, i.e., those high molecular weight materials which are not found in nature, with which the aromatic esters are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation. Such monomers have the general formula $>C=C<$, wherein the ethylenic group is substituted by a member of the group consisting of hydrogen, halogen, alkyl, aryl, aralkyl, alkaryl, alkenyl, alkynyl, cycloalkyl, haloalkyl, haloaryl, haloaralkyl, haloalkaryl, haloalkenyl, haloalkynyl, nitroalkyl, nitroaryl, nitroaralkyl, nitroalkaryl, nitroalkenyl, alkoxyalkyl, alkenyloxyalkyl, carboalkoxy, cyano, amido, dialkylamino, aldehydo, acyl, pyridyl, thienyl, furanyl, pyranyl, tetrahydrofuranyl, quinonyl, and higher heterocyclic groups. Specific examples of the above radicals are methyl, ethyl, propyl, butyl, phenyl, tolyl, xylyl, 4-ethylphenyl, benzyl, 2-phenylethyl, vinyl, propenyl, butenyl, ethynyl, propynyl, butynyl, cyclopentyl, 2-methylcyclopentyl, cyclohexyl, chloro, fluoro, bromo, iodo, 2-chloroethyl, chlorovinyl, 1,2-dichloroethyl, 2-chlorophenyl, 2-(4-chlorophenyl) ethyl, 4-bromobenzyl, 3-chloropropenyl, 3-nitropropyl, 4-nitrophenyl, 2-nitrobenzyl, nitrovinyl, ethoxy, methoxyethyl, vinyloxy, allyloxy, carbomethoxy, carboethoxy, acetyl, propionyl, cyano, formyl, acetoxy, propionoxy, carboxy, amido, furyl, carbazyl, indolyl, pyrrolyl, pyrrolidinyl, piperidinyl, diethylaminoethyl, and dimethylamido.

A particularly preferred class consists of the polymerized vinyl and vinylidene compounds, i.e., those having the $CH_2=C<$ radical. Compounds having such a radical are, e.g., the alkenes, such as ethylene, propylene, isobutylene; acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2(2-butoxyethoxy) ethyl methacrylate, 2(cyanoethoxy)ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene, polyvinyl alcohol; the vinyl carboxylates such as vinyl acetate, vinyl chloroacetate, vinyl proprionate, and vinyl 2-ethylhexanoate, the N-vinyl imides such as N-vinyl phthalimide and N-vinylsuccinimide; the N-vinyllactams such as N-vinylcaprolactam and N-vinylbutyrolactam; the vinyl aromatic hydrocarbon compounds such as styrene, α-methylstryene, 2,4-dichlorostyrene, α- or β-vinylnaphthalene, divinylbenzene and vinylfluorene; the vinyl ethers such as ethyl vinyl ether or isobutyl vinyl ether; vinyl substituted heterocyclic compounds such as vinyl pyridine, vinylpyrrolidone, vinylfuran or vinylthiophene; the vinyl of vinylidene ketones such as methyl vinyl ketone or isopropenyl ethyl ketone; vinylidene cyanide; etc. Homopolymers of the above compounds or copolymers or terpolymers thereof are beneficially modified by the aromatic esters. Examples of such copolymers or terpolymers are those obtained by polymerization of the following monomer mixtures: vinyl chloride-vinyl acetate, acrylonitrile-vinylpyridine, styrene-methyl methacrylate; styrene-N-vinylpyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, $>C=C<$, are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide, maleimide or N-phenylmaleimide, etc. Examples of particularly useful copolymers and terpolymers prepared from the $\alpha,\beta$-olefinic dicarboxy compounds are the copolymers of maleic anhydride and a vinyl compound such as ethylene, propylene, isobutylene, styrene, $\alpha$-methylstyrene, vinyl acetate, vinyl proprionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the aromatic esters are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the aromatic esters are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene, and linear copolymers or terpolymers such as butadiene-acrylonitrile copolymer, isobutylene-butadiene copolymer (butyl rubber), butadiene-styrene copolymer or 2-chlorobutadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other di-ethylenically unsaturated compounds such as diallyl carbonate, divinyl ether or divinylbenzene, as well as the crosslinked polymeric materials such as methyl methacrylate-diallyl methacrylate copolymer or butadiene-styrene-di-vinylbenzene terpolymer.

Polymerized materials prepared by subsequent reaction of preformed vinyl polymers, e.g., polyvinyl alcohol, the polyvinyl acetals such as polyvinyl formal or polyvinyl butyral, or completely or partially hydrolyzed polyacrylonitrile, are likewise modified in properties by the aromatic esters to give polymeric materials of enhanced stability.

Homopolymers and copolymers of the following polymerizable heterocyclic compounds are also advantageously modified by the present compounds: vinylpyridine, vinylfuran, vinyldibenzofuran, N-vinylcarbazole.

Polymeric materials with which the aromatic esters can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylenesulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylenephosphonic acid and styrenephosphonic acids and their salts, esters and amides; the silanes such as dimethylvinylsilane, diphenylvinylsilane and methylphenylvinylsilane, etc.

A class of synthetic polymeric materials with which the aromatic esters are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The aromatic esters may be incorporated into films of such cellulose derivatives by adding them to the solutions from which the films are cast or into the melts from which the fibers are extruded.

The aromatic esters are particularly suited to the modification of liquid resin compositions of the polyester type. Such resins are well adapted in structural fabrications, particularly in the manufacture of reinforced fibrous structures, e.g., glass or cellulose fibers. Polyester resins with which the aromatic esters are useful are either the linear polyesters which are obtained by the reaction of one or more polyhydric alcohols with one or more $\alpha,\beta$-unsaturated polycarboxylic acids alone or in combination with one or more saturated polycarboxylic acid compounds, or the crosslinked polyester resins which are obtained by reacting the linear polyester with a compound containing a $CH_2=C<$ group.

Polyhydric alcohols which are used for the preparation of the presently modified polyester resin are, e.g., ethylene glycol, diethylene glycol, propylene glycol, trimethylene glycol, trimethylolpropane, trimethylolethane, 1,4-butanediol, 4,4'-isopropylidenediphenol, 4,4'-isopropylidenedicyclohexanol, hydroquinone, 1,2-dihydroxynaphthalene, 4,4'-dihydroxybiphenyl, 4,4'-(2-butylidene)-di-m-cresol, glycerol, pentaerythritol, mannitol, etc.

The polycarboxylic acid compounds used in preparing the presently modified polyester resins are, e.g., the $\alpha,\beta$-unsaturated acids or the anhydrides or acyl halides thereof, such as maleic acid, maleic anhydride, maleyl chloride, fumaric acid, itaconic acid, itaconoyl chloride, mesaconic acid, citraconic acid, etc.; the alkanedicarboxylic acids, anhydrides or acyl halides thereof such as oxalic or malonic acid, anhydride or acyl halide, succinic acid, anhydride or halide; adipic acid, acyl halide or anhydride and sebacic acid, acyl halide or anhydride; the cycloparaffindicarboxylic acids such as 1,2-cyclohexanedicarboxylic acid or its anhydride or acyl halide; the aromatic dicarboxylic acids such as phthalic, terephthalic or 1,2-naphthalenedicarboxylic acid or the anhydrides or acyl halides thereof, the halogenated dicarboxylic compounds such as dichloroterephthalic acid or 1,4,5,6,7,7 - hexachlorobicyclo-(2,2,1)-5-heptene-2,3-dicarboxylic anhydride, etc.

The cross-linking component of the presently modified polyester resin can be any compound containing the group $CH_2=C<$ and having a boiling point of at least 60° C. Among the numerous compounds employed for this purpose, which may be mentioned are styrene, the nuclear or side-chained substituted styrene such as 3,4-dichlorostyrene, $\alpha$-chlorostyrene, $\alpha$-methylstyrene, 4-fluorostyrene, 2-(trifluoromethyl)styrene, 2,5-dimethylstyrene, isopropenyltoluene and 4-ethylstyrene; other vinyl-substituted hydrocarbons such as $\alpha$- or $\beta$-vinylnaphthalene, 4-vinylbiphenyl, 2-vinylacenaphthene and 2-vinylfluorene; the olefinic carboxylic acids and the esters, nitriles, amides and anhydrides thereof such as acrylic acid, methacrylic acid, ethyl acrylate, methyl methacrylate, acrylonitrile, methacrylonitrile, acrylamide, methacrylamide, acrylic anhydride and methacrylic anhydride; the vinyl esters such as vinyl acetate, vinyl chloroacetate, vinyl propionate and vinyl benzoate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; vinyl-substituted heterocyclic compounds such as N-vinylpyrrole, N-vinylpyridine and N-vinylsuccinimide; the olefinic aldehydes such as acrolein and methacrolein; and esters of unsaturated alcohols such as allyl acetate, triallyl phosphate, tetraallyl silicate, allyl fumarate, cinnamyl propionate, 3-butenyl acetate, etc.

The aromatic esters may be added to the polyester compositions at any stage of processing after the esterification. For preparation of casting and laminating resins, a recommended procedure is to first prepare a resin syrup by reacting the polyhydric alcohol component with the polycarboxylic acid component and then to add the compound to a mixture of the resin syrup and the cross-linking agent, i.e., the vinyl or vinylidene compound, previous to curing. This latter step is generally effected in the presence of a catalyst for polymerization, e.g., benzoyl peroxide, ethyl methyl ketone peroxide or tert-butyl hydroperoxide, and with optional use of additives such as mold lubricants, reinforcing agents, pigments, etc.

The aromatic esters are useful for modifying either the cast polyester resins or fibers and foams prepared from polyester resins. The compounds are preferably added to the ejection mix as in the case of fiber manufacture or to the foam mix prior to hardening. Good results can be obtained, however, by application of the compounds to the finished fibers or forms, e.g., by immersing or spraying the polyester, fibers or textiles prepared therefrom in or with solutions of the compounds or by similar treatment of the polyester foams.

The aromatic esters are also valuable adjuvants for film-forming polyesters which may or may not be modified with drying or semi-drying fatty oils or terpenic compounds.

The polyhydric alcohol component may be any of those mentioned above, except that in the case of the coating and impregnating agents the aliphatic compounds are more generally employed, e.g., glycerol, triethylene glycol, pentaerythritol, etc. The polycarboxylic acid need not be unsaturated, the more frequently employed acid component being phthalic anhydride. However, depending upon end utility and specific properties desired, acid components such as maleic anhydride, fumaric acid, adipic acid and sebacic acid are often used. For the production of, e.g., enamels, the esterification reaction may be conducted in the presence of fatty oils such as linseed oil, castor oil or soy bean or in the presence of terpenes such as pinene or terpineol. A small quantity of metallic soap which serves to accelerate the drying properties of the modified or unmodified alkyd resins is usually added to the reactant mixture. Such "driers" are, e.g., zinc stearate, calcium laurate, magnesium hydroxy stearate, etc.

The epoxy resins are another class of polymeric materials with which the present compounds are compatible and are advantageously used. These resins are condensation products formed by the reaction of a polyhydroxy compound and epichlorohydrin, which condensation products are subsequently cured by addition of cross-linking agents. The hydroxy compound may be any of the polyhydric compounds mentioned above as useful for the preparation of polyester resins; bisphenol, i.e., 4,4'-isopropylidenediphenol, is the commonly employed polyhydric compound. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine. The aromatic esters are advantageously added to the linear condensation product of the epichlorohydrin and the polyhydric compound, together with the cross-linking agent previous to curing or hardening. The resulting mixture is then cast into molds or it may be used for the manufacture of laminates, as bonding adhesive, and for the production of hard foams. For the latter use, the mixture of linear condensation product, the aromatic ester and cross-linking agent is cured in the presence of blowing agents.

The polyurethanes comprise another class of polymeric materials which are beneficially modified by the aromatic esters. The polyurethanes, like the above mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene esters having at least 2 hydroxyl groups, polythioether glycols, polyesteramides, etc. Advantageously the hydroxyl number of the polyhydric compound is not substantially more than about 225 and is seldom less than 56. When a polyester is used, the acid number is less than 10 and usually is as near to 0 as possible. Excess of the diisocyanate over that required to react with all of the active hydrogen atoms of the organic compound is advantageously used.

The polyesters used for the production of the polyurethane may be branched and/or linear. Thus, the useful polyesters and/or polyesteramides may include those obtained by condensing any polybasic (preferably dibasic carboxylic) organic acid, such as adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di($\beta$-hydroxyethyl) ether, etc. and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components, such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc. and diethylene glycol, triethylene glycol, tetraethylene glycol, polythioethylene glycol, polyethylene glycols 200, 400 and 600 etc., dipropylene glycol, tripropylene glycol, trithiopropylene glycol, polypropylene glycols 400, 750, 1,200 and 2,000 etc.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene, diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 1,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bis-phenyl carbamates of toluylene diisocyanate, p,p'-diphenylmethane diisocyanate, p-phenylene diisocyanate and 1,5-naphthalene diisocyanate, etc.

In practice, the polyurethane plastics are produced by bringing together the organic compound which contains at least 2 reactive hydrogen atoms and is capable of forming polyurethanes, with the polyisocyanate and an activator mixture. The latter is made of at least one cross-linking agent and/or an accelerator and may contain, if desired, added water or an aqueous solution. The addition of such an activator mixture to the mixture of polyisocyanates and active hydrogen compound initiates the cross-linking action needed to obtain homogeneous plastics or the cross-linking and foaming action necessary to obtain foam plastics. Useful cross-linking agents include water or aqueous solutions for foamed plastics and the polyalcohols, such as ethylene glycol, propylene glycol, butylene glycol, diethylene glycol, triethylene glycol, glycerol, etc. for non-porous plastics; and useful accelerators include the tertiary amines (either individually or in mixture) such as dimethylhexahydroaniline, diethylhexahydroaniline, reaction products of N,N'-diethylaminoethanol and phenylisocyanate, esteramines, etc. Also sodium phenolates, added with suitable plasticizers, may be employed in the manufacture of foamed products.

In fiber applications, the aromatic esters are advantageously incorporated into the spinning solution or into a solution of the polyurethane previous to precipitation from a non-solvent. For example, a mixture of substantially equimolar proportions of tetramethylene diisocyanate and 1,6-hexanediol are heated in an inert solvent, say, chlorobenzene, the compound is added to the resulting solution, and the whole is precipitated by pouring it into, say hexane.

When the presently provided modified polyurethane resin is to be used for the preparation of coatings or films, the compound is advantageously added to a solution of the polyurethane previous to hardening of the film or application of the coating.

Phenolic resins are also beneficially modified by the aromatic esters, which compounds are incorporated into the resin either by milling in molding applications or by addition to film-forming or impregnating and bonding solutions previous to casting. Phenolic resins with which the aromatic esters are employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions. When destined for use as molding resins the phenol is generally condensed with the aldehyde in the presence of alkali, and the aromatic ester is added to the resulting liquid resin previous to the curing stage.

The aminoplasts comprise another group of aldehyde resins which are beneficially modified by the aromatic esters. This class of polymeric materials are prepared by condensing formaldehyde with amino compounds containing from 1 to 9 carbon atoms and having the grouping

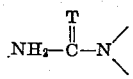

where T is selected from the class consisting of O, S and N—, and where N< represents a nitrogen atom having two single valences attached to separate hydrogen or carbon atoms or where the two free valences of the nitrogen atom represent a double bond attached to a carbon atom. The group N— of the above-described amino compounds represents a nitrogen atom having one free valence which is attached to a carbon or hydrogen atom. The condensation product is formed by using sufficient aldehyde, preferably formaldehyde, to react with at least one to all of the replaceable hydrogen atoms of the amino groups.

Examples of the aminoplasts which are modified according to the invention are the heat-convertible condensation products of an aldehyde with urea, thiourea, guanidine, cyanamide, dicyandiamide, alkyl or aryl guanamines, and the triazines such as melamine, 2-chloro-4,6-diamino-1,3,5-triazine and 2-hydroxy-4,6-diamino, 1,3,5-triazines. The aminoplasts may be prepared by using various aldehydes instead of formaldehyde, e.g., there may be used acetaldehyde, propionaldehyde, furfural, glyoxal and the like.

In molding applications, the compound is compounded with the resin together with the customary dyes or pigments and fillers, e.g., cellulose, asbestos, wood flour, glass fibers, chopped cotton fabric.

Also beneficially modified by the aromatic esters are the nylons, i.e., the superpolyamides which are generally obtained by the condensation of a diamine, e.g., hexamethylenediamine with a dicarboxylic acid, e.g., adipic acid.

Other polyamides with which the aromatic esters are beneficially employed, e.g., for improvement in light stability, are the polypeptides which may be prepared, e.g., by the condensation reaction of an N-carboalkoxy substituted or an N-acyl substituted α-amino carboxylic acid with the same or different unsubstituted amino carboxylic acid, e.g., by reaction of N-carbobenzyl oxyglycin with glycine or a mixture of glycine and lysine, or an N-carboxy amino acid anhydride such as N-carboxy-DL-phenylalanine anhydride.

Still another class of polyamides which are beneficially modified according to the invention are the polymeric lactams, e.g., polycaprolactam, piperidone, 2-oxohexamethyleneimine and other cyclic amides. The aromatic esters can be incorporated into molding or extruding compositions for light stabilizing effects.

The aromatic esters are also advantageously employed as adjuvants for polymeric aldehydes, e.g., homopolymeric, high-molecular weight formaldehyde.

The aromatic esters are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc.

The following examples illustrate methods of preparing the aromatic esters of this invention:

*I.—Preparation of bis(4-t-butylphenyl) terephthalate*

A mixture of 20 g. of terephthalyl chloride, 30 g. of 4-t-butylphenol, 100 g. benzene and 2.5 g. magnesium turnings is heated for 1 hour at a temperature of 80–90° C. in a suitable reaction vessel. Since most of the benzene evaporates, the product is taken up in 150 ml. of chloroform. The chloroform solution of the product is filtered and washed with a dilute HCl solution. The water layer is allowed to separate and is decanted. The mixture is washed twice with a dilute aqueous solution of NaOH and then washed once with distilled water. The resulting washed solvent solution is evaporated and the product is recrystallized from ethanol. There is obtained 5 gms. of bis(4-t-butylphenyl) terephthalate having a melting point of 226° C.

*II.—Preparation of bis(4-butylphenyl) isophthalate*

The procedure of Example I is repeated except that an equivalent amount of isophthalyl chloride is substituted for the terepthalyl chloride of said example. A good yield of bis(4-t-butylphenyl) isophthalate, M.P. 160–161° C., is obtained.

*III.—Preparation of bis[4(1,1,3,3-tetramethylbutyl) phenyl] isophthalate*

The produce of Example II is repeated except that an equivalent amount of 4(1,1,3,3-tetramethylbutyl) phenol is substituted for the 4-t-butylphenol of said example, and the benzene is distilled off until a temperature of 120° C. is reached; and this temperature is maintained for a period of 3 hours. A good yield of a product identified as bis[4(1,1,3,3-tetramethylbutyl)phenyl] isophthalate, M.P. 137.5–138° C., is obtained.

*IV.—Preparation of bis($C_{12}$-alkylphenyl) isophthalate*

This example describes the preparation of the above-named isophthalate from a $C_{12}$-alkylphenol, para to ortho ratio (i.e., the ratio of infrared bands) 7.6 to 1, distillation range (5 mm. Hg):

|  | ° C. |
|---|---|
| 1st drop | 310 |
| 5–95% | 319–332 |
| End | 335 | whose alkyl substituent is derived from a propylene tetramer (boiling range 185–205° C.).

A mixture containing 101.5 g. of isophthalyl chloride, 265 g. of said $C_{12}$-alkylphenol and 200 ml. of benzene is placed in a flask. The mixture is agitated and 165 ml. of triethylamine are slowly added thereto. The resulting mixture is heated to reflux and held there for one hour. The reaction mixture is then washed once with a dilute aqueous solution of HCl and with distilled water until a test shows that the mixture is neutral. The water and benzene are distilled off (150° C./50 mm. Hg). The product is filtered and there is obtained 284 g. of bis($C_{12}$-alkylphenyl) isophthalate (straw yellow liquid, $n_D^{25} = 1.5339$).

*V.—Preparation of bis($C_9$-alkylphenyl) isophthalate*

The procedure of Example III is repeated except that an equivalent amount of $C_9$-alkylphenol, I.R. para to ortho ratio 6.1 to 1, distillation range (5 mm. Hg):

|  | ° C. |
|---|---|
| 1st drop | 288 |
| 5–95% | 288–313 |
| End | 316 | whose alkyl substituent is derived from a propylene trimer (boiling range 121–138° C.), is substituted for the $C_{12}$-alkylphenol of Example III. A 77% yield of bis($C_9$-alkylphenyl) isophthalate (straw yellow, semi-solid at room temperature) is obtained. This compound has a refractive index $n_D^{25}$ of 1.5418.

Using the procedure of the preceding example, except by utilizing an equivalent amount of each of the following alkylphenols (Column 1), analogous compounds (Column 2) are formed.

| Ex. No. | Column 1 | Column 2 |
|---|---|---|
| VI | $C_{15}$-alkylphenol (I.R. para to ortho ratio 7.5 to 1) derived from propylene pentamer (boiling range 200–265° C). | Bis($C_{15}$-alkylphenyl) isophthalate. |
| VII | $C_{13}$-alkylphenol (I.R. para to ortho ratio 7.7 to 1) derived from a propylene polymer mixture (B.P. 200–260° C.) containing an average of 13 carbon atoms. | Bis($C_{13}$-alkylphenyl) isophthalate. |
| VIII | $C_{18}$-alkylphenol (I.R. para to ortho ratio 7.2 to 1) derived from propylene hexamer (boiling range 260–290° C.). | Bis($C_{18}$-alkylphenyl) isophthalate. |
| IX | $C_{21}$-alkylphenol (I.R. para to ortho ratio 7.4 to 1) propylene polymer mixture (boiling range 295–325° C.) containing an average of 21 carbon atoms and consisting chiefly of propylene hexamer and propylene octamer. | Bis($C_{21}$-alkylphenyl) isophthalate. |

The products of Examples IV through IX are in fact mixtures comprising the various para-alkylphenyl and ortho-alkylphenyl esters of isophthalic acid that result from the use of the particular alkylphenol.

*X.—Preparation of tris[4(1,1,3,3-tetramethylbutyl) phenyl] trimesate*

A mixture containing 3 g. of 4(1,1,3,3-tetramethylbutyl) phenol, 1.4 g. of trimesyl chloride and 15 g. of pyridine is placed in a suitable flask and heated on a steam bath overnight. The reaction product mixture is then diluted with water and filtered. The precipitate is washed with water and dried. The dried precipitate is then dissolved in chloroform, and several volumes of methanol are added. When the product has crystallized, the mixture is filtered. A good yield of tris[4(1,1,3,3-tetramethylbutyl)phenyl] trimesate, M.P. 183–187° C. is obtained.

Using the procedure of the preceding example, except by utilizing the following alkylphenols (Column 1) in place of the 4(1,1,3,3-tetramethylbutyl) phenol, analogous compounds (Columne 2) are formed.

| Example No. | Column 1 | Column 2 |
|---|---|---|
| XI | 4-n-pentylphenol | Tris(4-n-pentylphenyl) trimesate. |
| XII | 4-isodecylphenol | Tris(4-isodecylphenyl) trimesate. |
| XIII | 2-n-nonylphenol | Tris(2-n-nonylphenyl) trimesate. |
| XIV | Mixture consisting of 30% by weight of 4-t-butyl-phenol and 70% by weight of 4(1,1,3,3-tetramethylbutyl)phenol. | (4-t-butylphenyl)bis[4(1,1,3,3-tetramethylbutyl) phenyl]trimesate. |
| XV | 4-n-dodecylphenol | Tris(4-n-dodecylphenyl) trimesate. |
| XVI | 2,4-dimethoxyphenol | Tris(2,4-dimethoxyphenyl) trimesate. |
| XVII | 2,4-di-t-butylphenol | Tris(2,4-di-t-butylphenyl) trimesate. |
| XVIII | $C_{12}$-alkylphenol (I.R. para to ortho ratio 20 to 1) derived from propylene tetramer (boiling range 185–205° C.). | Tris($C_{12}$-alkylphenyl) trimesate. |
| XIX | $C_9$-alkylphenol of Example V. | Tris($C_9$-alkylphenyl) trimesate. |

It should be noted that the products of Examples XVIII and XIX are in fact mixtures comprising the various para-alkylphenyl and ortho-alkylphenyl esters of the trimesic acid that results from the use of the particular alkylphenol reactant.

*Example XX*

The procedure of Example IV is repeated except that an equivalent amount of 2,4-dimethoxyphenol is substituted for the $C_{12}$-alkylphenol of said example. A good yield of bis(2,4-dimethoxyphenyl) isophthalate is obtained.

*Example XXI*

The procedure of Example IV is repeated except that an equivalent amount of terephthalyl chloride is substituted for the isophthalyl chloride of said example. A good yield of bis($C_{12}$-alkylphenyl) terephthalate is obtained.

Using the procedure of the preceding example, except that an equivalent amount of the following alkylphenols (Column 1) analogous compounds (Column 2) are formed.

| Example No. | Column 1 | Column 2 |
|---|---|---|
| XXII | $C_9$-alkylphenol of Example V. | Bis($C_9$-alkylphenyl) terephthalate. |
| XXIII | $C_{15}$-alkylphenol of Example VI. | Bis($C_{15}$-alkylphenyl) terephthalate. |
| XXIV | $C_{13}$-alkylphenol of Example VII. | Bis($C_{13}$-alkylphenyl) terephthalate. |
| XXV | $C_{12}$-alkylphenol of Example XVIII. | Bis($C_{12}$-alkylphenyl) terephthalate. |
| XXVI | 2,4-dimethoxyphenol | Bis(2,4-dimethoxyphenyl) terephthalate. |
| XXVII | 2-t-butyl-4-nonylphenol | Bis(2-t-butyl-4-nonylphenyl) terephthalate. |
| XXVIII | 2,4-di-t-butylphenol | Bis(2,4-di-t-butylphenyl) terephthalate. |

It should be noted that the products of Examples XXI through XXV are in fact mixtures comprising the various para-alkylphenyl and ortho-alkylphenyl esters of terephthalic acid that result from the use of the particular alkylphenol reactant. The desired stabilizing effects are obtained when such isomeric mixtures are employed provided that the para to ortho ratio is as specified above. Even in the case of the preferred compounds of Formula II, the presence of relatively minor amounts of other than the para isomer does not produce any significant adverse effect.

*XXIX.—Preparation of bis(4-butoxyphenyl) isophthalate*

The procedure of Example II is repeated except that an equivalent amount of 4-butoxyphenol is substituted for the 4-t-butylphenol of said example. A good yield of bis(4-butoxyphenyl) isophthalate, M.P. 129–131° C., is obtained.

In evaluating the light stabilizing efficiency of the compounds of this invention, use is made of the following empirical testing procedures:

(1) *Carbonyl content.*—The carbonyl content of the composition is determined after exposure by measurement of the infrared absorption in the 5.82 millimicron region and is expressed as mols×$10^4$ per liter. Reference is made to the following two publications concerning the determination of carbonyl content by infrared measurements: Rugg, Smith and Bacon, J. Polymer Sci., 13, 535 (1954), and Cross, Richards and Willis, Discussions Faraday Soc., No. 9, 235 (1950).

(2) *Vinyl group formation.*—Infrared spectrographic measurements are made before and after exposure using the baseline technique in the region of 11.0 microns and the extinction coefficients of J. A. Anderson and W. D. Sugfried, Anal. Chem., 20, 998 (1948). The amount of vinyl ($>C=C<$) formed during exposure expressed in mols×$10^4$ per liter.

(3) *108° C. bend test.*—Specimens were folded and the amount of cracking, crazing, etc. was recorded.

(4) *Compatibility.*—This was a qualitative estimation based on the amount of blooming or exudation from the unexposed films after a month or so.

The following examples in which all parts are parts and percentages are by weight, unless otherwise specified, more fully illustrate the nature of the invention.

*Example 1*

Test compositions are prepared by incorporating the additive into polyethylene (mol wt. 20,000) on a heated roll mill. Thereafter the polyethylene is compression molded into sheets about 6 mils thick. Film samples containing the various additives (described below) and the control film are exposed for 200 hours to ultraviolet radiation, a major portion of which is due to the 3130 and 3657 A. mercury lines (G.E. H3FE lamp). The films are exposed at a distance of 5 inches from a light source having a total ultraviolet emission of about 10 watts for a period of about 200 hours. The results obtained for several aromatic esters of this invention are set forth in Table A below.

Results similar to those obtained with composition (1–3) are realized upon substituting the following compounds, in substantially the same amount, for the isophthalate of said composition:

Bis(3-octoxyphenyl) terephthalate
Bis(2,4-dimethoxyphenyl) isophthalate
Bis(4-t-butylphenyl) phthalate
Bis[3(2,3-dimethylheptyl)phenyl] 4-hexadecyloxyphthalate
Tris(4-t-butylphenyl) hemimellitate
Tris(3-isopropoxyphenyl) trimesate
Bis(4-t-butylphenyl) 3,4-dichlorophthalate
Bis[4(2-ethylhexyl)phenyl] 3,4,5,6-tetrachlorophthalate
Bis(4-eicosylphenyl) phthalate Results similar to those obtained with compositions (1–4), (1–5) and (1–6) are realized upon substituting the following compounds, in substantially the same amount, for the isophthalates of said compositions:

Bis[4(1,1,3,3-tetramethylbutyl)phenyl] isophthalate
Tris(4-t-butylphenyl) trimesate
Bis($C_9$-alkylphenyl) isophthalate (see Ex. V)
Bis($C_{12}$-alkylphenyl) isophthalate (see Ex. IV)
Bis($C_{13}$-alkylphenyl) isophthalate (see Ex. VII)
Bis(4-heptadecylphenyl) isophthalate
Bis[4(1,1,3,3-tetramethylbutyl)phenyl] terephthalate
Tris [4(1,1,3,3-tetramethylbutyl)phenyl] trimesate
Bis($C_{21}$-alkylphenyl)isophthalate (see Ex. IX)

*Example 2*

A piece of thin rubber film (natural gum rubber) is placed in chloroform for one hour, removed and then dried for two hours at room temperature. This piece is cut into two smaller pieces, one of which is placed in a chloroform solution containing 0.45% (w./v.) [4(1,1,3,3-tetramethylbutyl) phenyl] (4-t-butylphenyl) isophthalate for one hour and then dried at room temperature. The two pieces are exposed for 60 hours to an ultraviolet lamp (General Electric H3FE) at a distance of 5 inches.

The rubber film containing the isophthalate ester can be stretched several times its length without breaking, while the film which does not contain the phthalate breaks when it is extended 1½ times its length.

Similar results are obtained when the isophthalate used above is replaced with the same amount of each of the various phthalates of Example 1.

*Example 3*

A piece of Watman filter paper (pure, unsized cellulosic paper) is cut into two pieces. One piece (control film A) is dipped in chloroform solution and then dried. The other piece is dipped in the 0.45% ester solution of Example 2 and then dried (stabilized film B). Each of these films are exposed for a total of 60 hours to a General Electric UA–2 lamp at a distance of 10 inches. The tensile strength (lb./in.) of each of the films, i.e., control

TABLE A

| Comp. No. | Additive | Conc., percent | Carbonyl Content | Vinyl Group Formation | Response to 180° Bend Test |
|---|---|---|---|---|---|
| 1-1 | None | None | 261 | 186 | Very poor. |
| 1-2 | Bis(4-t-butylphenyl) terephthalate. | 1.0 | 188 | 55 | Good. |
| 1-3 | Bis(4-butoxyphenyl) isophthalate. | 1.0 | 330 | 0 | Fair. |
| 1-4 | Bis($C_9$-alkylphenyl) isophthalate. | 3.0 | 23 | 0 | Very good. |
| 1-5 | (4-t-butylphenyl) [4(1,1,3,3-tetramethylbutyl)phenyl] isophthalate. | 2.0 | 12 | 0 | Do. |
| 1-6 | Bis(4-t-butylphenyl) isophthalate. | 1.0 | 81 | 44 | Do. | film A and stabilized film B, at various intervals, is set forth in Table B below:

TABLE B

| Hours of Exposure | Tensile Strength | |
|---|---|---|
| | A | B |
| 0 | 14.4 | 16.0 |
| 5 | 11.1 | 13.5 |
| 20 | 7.7 | 10.2 |
| 60 | 3.1 | 3.7 |

Similar results are obtained when the isophthalate of composition B is replaced by the same amount of each of the phthalates of Example 1, in that the tensile strength of the film containing the phthalate ester is greater than the tensile strength of the control film.

*Example 4*

Polyethylene (avg. mol. wt. ca. 20,000) films of varying thicknesses containing varying amounts of the following compounds:

(4-1) Bis(4-t-butylphenyl) isophthalate
(4-2) Bis[4(1,1,3,3-tetramethylbutyl)phenyl] isophthalate are prepared by dry blending each of the compounds in the amount desired, extruding the compositions twice and then blowing them into films. A control film is prepared in the same manner. The films are exposed to direct sunlight in the State of Florida by mounting the films (unbacked at an angle of 45° from the horizontal) on racks facing the south. Samples of each film are removed periodically and tested for carbonyl content and vinyl group formation. The results obtained are set forth in Tables C and D below:

TABLE C.—5 MIL FILM

| Comp. No. | Additive | Concentration (percent by weight) | Exposure Time | | | |
|---|---|---|---|---|---|---|
| | | | 1.2 Months | | 8 Weeks | |
| | | | Carbonyl | Vinyl | Carbonyl | Vinyl |
| 1 | None | None | 251 | 120 | 452 | 186 |
| 2 | Compound (4-1) | 0.2 | 163 | 41 | 375 | 93 |
| 3 | do | 0.5 | 127 | 38 | 285 | 98 |
| 4 | Compound (4-2) | 0.2 | 170 | 47 | 388 | 91 |
| 5 | do | 0.5 | 101 | 32 | 285 | 73 |

TABLE D.—2 MIL FILM

| Comp. No. | Additive | Concentration (percent by weight) | Exposure Time | | | |
|---|---|---|---|---|---|---|
| | | | 1.2 Months | | 8 Weeks | |
| | | | Carbonyl | Vinyl | Carbonyl | Vinyl |
| 6 | None | None | 252 | | 565 | 186 |
| 7 | Compound (4-1) | 0.2 | 178 | | 425 | 108 |
| 8 | do | 0.5 | 137 | | 340 | 55 |
| 9 | Compound (4-2) | 0.2 | 173 | | 470 | 94 |
| 10 | do | 0.5 | 158 | | 383 | 71 |

The date in the following table represents the results obtained with 5 mil films after 14 weeks' exposure.

TABLE E

| Composition number: | Carbonyl content |
|---|---|
| 1 | 1385 |
| 2 | 1225 |
| 3 | 425 |
| 4 | 1270 |
| 5 | 720 |

*Example 5*

Bis[4(1,1,3,3-tetramethylbutyl)phenyl] isophahalate is added to a xylene solution of polypropylene (visc. molecular weight 220,000). This mixture is evaporated and then pressed between 2 glass plates into a film 8 mils thick on a hot plate. A control film, which contains no additive is prepared in the same manner. The two films are irradiated, side by side, under a high intensity mercury arc lamp (General Electric UA-2, photochemical lamp) at a distance of 8½ inches from the lamp. After 75 minutes of exposure, the carbonyl content of each of the films is determined. The carbonyl content of the control film is seven to eight times that of the film containing 1% by weight of the isophthalate ester.

Similar results are obtained when equal amounts of other aromatic esters are substituted for the above named isophthalate.

*Example 6*

A series of film samples are prepared containing one of the following two additives:

(6-1) Bis[4(1,1,3,3-tetrimethylbutyl)phenyl] isophthalate
(6-2) Bis(4-t-butylphenyl) isophthalate These additives are incorporated into the polymers either by addition to the solution prior to casting or by working polymer and additive on a stainless steel hot plate with a spatula. The films are prepared by either casting the mixture from an appropriate solvent or pressing the mixture of polymer and additive between two glass slides at 190-240° C. Film thickness varies depending upon the method of preparation, however, differences in thickness between films containing the additive and corresponding controls is kept below 10%.

The films are mounted in special holders and exposed for 150 hours to an ultraviolet light source (G.E. lamp H3FE). At the end of the exposure period, each film containing additive is compared with the corresponding control film for gross differences in degree of deterioration. Comparisons are made by:

(1) Increase of degradation carbonyl at the infrared carbonyl region.
(2) Response to 180° bend.
(3) Response to penetration by a sharp needle.
(4) Visual observation of film condition (crazing, cracking, etc.).

The results are listed in Table F. The degree of stabilization due to additive is rated as follows:
(1) Some evidence of stabilization.
(2) Definite evidence of stabilization.
(3) Control deteriorated (cracked, disintegrated, etc. in holder) whereas the film containing the additive does not.

(26) Tetra(4-t-butylphenyl) mellophanate
(27) (4-t-butylphenyl)bis(3-isopropoxyphenyl) trimesate
(28) Penta(4-t-butylphenyl) benzene pentacarboxylate
(29) Penta[4(1,1,3,3-tetramethylbutyl)phenyl] benzene pentacarboxylate
(30) Hexa(4-t-butylphenyl) mellitate

TABLE F

| Composition Number | Polymer Name | Polymer Physical Properties | Film Preparation Method | Film Thickness (microns) | Additive Compound | Additive Conc., percent | Stabilization Rating |
|---|---|---|---|---|---|---|---|
| 1 | Cellulose nitrate | Visc. (10% soln. in solv. mixture of 75% butyl acetate, 25% ethanol)=60 cps.; $N_2$ content=12%. | Cast from acetone | 155 | 6-2 | 2 | 3 |
| 2 | Polyvinylidene chloride | Sp. grav.=1.680, $n_D^{25}$=1.615. | Pressed between 2 glass slides at 190-240° C. | 135 | 6-1 | 2 | 1 |
| 3 | Styrene-butadiene | Sp. grav.=1.030, Iodine No.=57.8, $n_D^{25}$=1.5785. | ---do--- | 230 | 6-2 | 2 | 1 |
| 4 | Styrene-acrylonitrile | Sp. grav.=1.075, HDT at 264 p.s.i.=198° F. | ---do--- | 173 | 6-2 | 2 | 2 |
| 5 | Chlorinated Rubber | 67% chlorine, Sp. grav.=1.563, $n_D^{25}$=1.554. | Cast from benzene | 50 | 6-1 | 1.3 | 3 |

Similar results are obtained when equal amounts of the following aromatic esters are substituted for the isophthalates of this example:

Bis(4-t-butylphenyl) terephthalate
Bis($C_{12}$-alkylphenyl) isophthalate (see Ex. IV)
Bis($C_9$-alkylphenyl) isophthalate (see Ex. V)
(4-t-butylphenyl)[4(1,1,3,3-tetramethylbutyl)phenyl] isophthalate
Tris(4-t-butylphenyl) trimesate
Bis(4-nonylphenyl) isophthalate
Bis($C_{13}$-alkylphenyl) isophthalate (see Ex. VII)
Bis(4-heptadecylphenyl) isophthalate
Bis[4(1,1,3,3-tetramethylbutyl)phenyl] terephthalate
Tris[4(1,1,3,3-tetramethylbutyl)phenyl] trimesate In each case the film containing the additive exhibits evidence of stabilization when compared with the control film.

*Example 7*

This example describes the stabilizing effect of the following compounds on polystyrene:

(1) Bis[4(2,3-dimethylheptyl)phenyl] isophthalate
(2) Bis(4-t-butylphenyl) terephthalate
(3) Bis(4-butoxyphenyl) isophthalate
(4) Bis($C_9$-alkylphenyl) isophthalate (see Ex. V)
(5) (4-t-butylphenyl)[4(1,1,3,3-tetramethylbutyl)phenyl] isophthalate
(6) Bis(4-t-butylphenyl) isophthalate
(7) Tris(4-t-butylphenyl) trimesate
(8) Bis($C_{12}$-alkylphenyl) isophthalate (see Ex. IV)
(9) Bis($C_{13}$-alkylphenyl) isophthalate (see Ex. VII)
(10) Bis($C_9$-alkylphenyl) terephthalate (see Ex. XXI)
(11) Bis[4(1,1,3,3-tetramethylbutyl)phenyl] terephthalate
(12) Bis[4(1,1,3,3-tetramethylbutyl)phenyl] isophthalate
(13) Tris[4(1,1,3,3-tetramethylbutyl)phenyl] trimesate
(14) Bis($C_{12}$-alkylphenyl) terephthalate (see Ex. XXV)
(15) Bis(2,4-dimethoxyphenyl) terephthalate
(16) Tris(4-n-dodecylphenyl) trimesate
(17) Tris($C_{12}$-alkylphenyl) trimesate (see Ex. XVIII)
(18) Tris($C_9$-alkylphenyl) trimesate (see Ex. XIX)
(19) Bis(2-t-butyl-4-nonylphenyl) terephthalate
(20) Bis[4(1,1-dimethyloctyl)phenyl] terephthalate
(21) Bis($C_{13}$-alkylphenyl) terephthalate (see Ex. XXIV)
(22) Bis(2,4-di-t-butylphenyl) terephthalate
(23) Tris(2,4-di-t-butylphenyl) trimesate
(24) Bis(4-octoxyphenyl) terephthalate
(25) Tetra(4-t-butylphenyl) pyromellitate To a 10% solution of polystyrene in benzene there is respectively added each of the above compounds in a quantity calculated to be 2% by weight of the total solids content.

The resulting mixtures are air dried at room temperature and then pressed between two glass slides at 190°–240° C. to a thickness of about 150 microns. Control films are prepared in a similar manner. Each film is mounted in a holder and exposed to an ultraviolet lamp (G.E. H3FE) for a period of 200 hours. At the end of this period the control film shatters when pierced by a sharp needle, whereas each film containing an additive when pierced with the needle does not shatter.

*Example 8*

Compounds 1, 2, 4–17, 19, 21 and 23 of Example 7 are respectively added to a high molecular weight polymeric formaldehyde resin (sp. grav.=1.425; HDT at 264 p.s.i.=212° F.; modulus of rigidity=178,000 p.s.i.) by working the compound and the resin on a stainless steel hot plate and then pressing the resulting mixture into a film (thickness ca. 150 microns) between two glass plates at a temperature of 190°–240° C. Two control films are prepared in a similar manner. The films are placed in holders and exposed at a distance of 5 inches to the ultraviolet rays of a G.E. H3FE lamp for a total of 150 hours. At the end of the test period the control films break when subjected to the 180° bend test, while the films containing the additives of this invention do not.

*Example 9*

The stabilizing effect of Compounds 4–9, 12–17, 19, 22 and 23 of Example 7 on polyvinyl chloride is described in this example. Each of these stabilizers is blended with a polyvinyl chloride mixture (containing 40 parts per 100 parts of resin of di(2-ethylhexyl) phthalate and 0.5 part per 100 parts of resin of cadmium/barium dilaurate) in an amount which is sufficient to provide 2.7 parts by weight of stabilizer based on the polyvinyl chloride content. Each mixture is pressed at temperatures of 190–240° C. into a film about 150 microns thick and exposed to an ultraviolet lamp as in Example 8. Control films are prepared and exposed in a similar manner except, of course, that no stabilizer is added. After exposure, the films are examined visually for darkening. In each case, the films containing the aromatic esters are much lighter in color than the control films.

Example 10

This example describes the light stabilizing effect of Compounds 2–15, 17, 18, 20 and 21 of Example 7 in ethyl cellulose and cellulose acetate.

Each of said compounds are respectively added to 12% solutions of cellulose acetate in acetone and to 5% solutions of ethyl cellulose in ethylene dichloride, said compounds being added in a quantity equal to 5% by weight of the cellulose present in the solutions. Films are cast from the resulting solutions and air dried to remove the solvent. Control films are prepared in a similar manner. The films (about 150 microns in thickness) containing the compounds and the control films are exposed to ultraviolet light as in Example 7 and examined visually at the end of the test period for evidence of deterioration. In each case the control films show evidence of deterioration, while the stabilized films containing the compounds of this invention do not.

Example 11

To a 10% solution of a 50:50 molar ratio styrene:methyl methacrylate copolymer in benzene there is respectively added one of the Compounds 1, 4, 6–10, 12–14, 20 and 21 of Example 7 in an amount which will provide 3% by weight of the compound based on the weight of the copolymer. The resulting mixtures and a control mixture, which does not contain any of the compounds, are cast into films (about 200 microns thick) and air dried for 24 hours. After exposure to an ultraviolet light source, as in Example 7, for a period of 200 hours, the films containing the compounds and the control film are tested for gross differences in deterioration by piercing the films with a sharp needle. In each case the film containing the aromatic ester does not crack, while the control film cracks.

Example 12

This examples describes the testing of Compounds 4–17, 19, 21 and 23 of Example 7 as light stabilizers for polymeric ethyl methacrylate. Each of said compounds are added at room temperature to a separate 15% solution of the polymeric methacrylate in an amount which will provide 2% by weight of stabilizer based on the weight of polymer present. Films are cast from the resulting mixtures and air dried for 24 hours. Control films consisting of polymer are prepared in a similar manner. Each film is about 50 microns (ca. 2 mils) thick. The films are exposed as in Example 10 and then evaluated for gross differences in deterioration between the control films and the stabilized films. Visual observation reveals that the control films show slight evidence of degradation, while the stabilized films do not.

Example 13

The example describes the testing of Compounds 2–18, 20 and 21 of Example 7 as light stabilizers for 1:1 molar copolymers of maleic anhydride and vinyl methyl ether or ethylene. Each compound is added to separate 15% solutions of the ethylene-maleic anhydride copolymer in acetone and to separate 7% solutions of the vinylmethyl-ether-maleic anhydride copolymer in dimethylformamide. The quantity of the compound employed in each instance is equal to 8% by weight of the copolymer present in the solution. The resulting mixtures and control mixtures consisting of the respective copolymers and their solvents, are cast into films and the solvent is evaporated from the films at heat lamp temperature. The films (each about 50 microns thick) are exposed to ultraviolet light as in Example 7 for a period of 300 hours. Evaluation of the films after the test period by visual observation indicates that the films containing the compounds are more stable than the control films to the degradative effects of ultraviolet light.

Example 14

A film 75 microns thick is cast from a tetrachloroethane dope of a polyester made from 1,5-pentanediol and an equimolar mixture of sebacic acid and p,p'-dicarboxy diphenyl sulfone. This film is exposed in an Atlas Twin-arc Weatherometer, containing twelve 20-watt Westinghouse fluorescent sun lamps in addition to the two carbon arcs, for a period of 100 hours. The film breaks when subjected to the 180° bend test.

Similar films are made from dopes containing 3% by weight, based on the weight of the polyester, of Compounds 2–17, 19, 20 and 21 of Example 7. Each of the films are still flexible after 100 hours exposure in the Weatherometer.

Example 15

A series of samples are prepared from a basic formulation consisting of 95 parts of a copolymer prepared from 85 percent vinylidene chloride and 15 percent vinyl chloride and 5 parts of acetyl triethyl citrate as a plasticizer. To all but two of the samples prepared, there is respectively added an amount of the compounds employed in Example 14, which is equal to 3% by weight of the copolymer. The remaining two samples are left blank for comparative purposes. Each sample is molded into a sheet 4 mils (ca. 100 microns) thick and exposed for 300 hours to an ultraviolet light as in Example 7. After exposure, the sheets are examined visually for darkening. In each case, the film containing the compounds of this invention are much lighter in color than the control films.

Example 16

A high melting crystallizable polyethylene having a density of 0.945 is compounded on hot rolls with 2% by weight of bis[4(1,1,3,3 - tetramethylbutyl)phenyl] isophthalate. The composition is compression molded into films 5 mils thick and cut into a sample 2½ x ½ inch in size. A control film is prepared in a similar manner. These films are exposed in an Atlas Weatherometer (described in Example 15) for a period of 500 hours. Examination of the infrared carbonyl content of each of the films indicates that the amount of degradation carbonyl in the stabilized film is significantly less than the amount of degradation carbonyl in the unstabilized film.

Similar results are obtained when the bis[4(1,1,3,3-tetramethylbutyl)phenyl] isophthalate is replaced with an equivalent amount of Compounds 4, 6, 8, 9, 11 and 13 of Example 7.

As is obvious from the above examples, the aromatic esters contemplated herein are valuable stabilizers for polymeric materials generally. The nature in which they are incorporated into or applied to the polymer materials will depend upon the individual nature of the polymer and upon its physical form; but it is generally that which is customarily employed when the same polymers in the same physical form are contacted with prior art adjuvants. Thus when a polymer is to be employed in coatings or impregnating agents or for the production of films, additions are usually introduced into the solutions or dispersions of the finished polymer, unless the polymer is of the thermosetting type, in which case the stabilizer may be mixed with the prepolymer and hardening or cross-linking agent previous to curing.

When the polymer is to be used for the preparation of fibers, the stabilizer may be introduced into the extrusion melt or into the solutions from which the fibers are formed; however, for many purposes a treating agent is often applied to fibrous materials by immersing either the fibers or textiles made therefrom into baths containing the agent. When the polymer is to be molded, the stabilizer is usually incorporated by milling with the hard, finished polymer previous to molding by pressure. However, here again, the point at which the stabilizer is introduced will vary with the nature of the polymer; for example, in the case of polymers which are cross-linked or in the case of thermosetting polymers, the stabilizer is more advantageously introduced together with the cross-linking agent or with the hardening agent previous to the final molding step. When the polymer is to be employed in the production of hardened foams the stabilizer is generally added to the mix which is to be foamed; however, in the case of the foam jet extrusion or pneumatogen injection extrusion, the stabilizer may be added just before the extrusion step. The point at which the present stabilizers are added or applied to the polymer is thus determinable in the current practices in the specific arts.

Variations or modifications of the compounds and quantities employed in the examples can be made to accommodate different requirements so long as the compound belongs to the general class of aromatic esters hereinbefore defined. The same process, as illustrated in the above examples, will be found to be satisfactory for producing additional examples, e.g., by employing in place of the specific aromatic esters used in the examples, other specific aromatic esters within the broad scope of the structural formula given on page 1 of the application; or by employing different vinyl polymers of different cellulose derivatives than those used in the examples, or different polymers altogether, e.g., alkyl, epoxypolyester or polyurethane resins for those used in the examples. However, it is believed that no purpose will be shown by further multiplying the examples.

The choice and the amount of the particular aromatic esters used to stabilize polymers can vary considerably depending upon many factors, as for example the nature of the particular polymer, the thickness of the film or other article, the conditions of service to be encountered. Thus, in the stabilization of natural and synthetic rubber to be used in the manufacture of tires which are normally subjected to the action of sunlight, as well as exposure to the elements, use of relatively high concentrations of the stabilizers of this invention is advantageous. The same is true of films such as polyethylene films which are used in outdoor applications. On the other hand, when the article of manufacture is not to be subjected to such severe conditions, such as in the case of molded goods fabricated from various polymers which are to be used indoors, relatively low concentrations can be successfully utilized. Accordingly, the amount used is a stabilizing amount determinable by a consideration of these many factors. In general, concentrations of the aromatic esters of from about 0.001 to about 10% by weight of the polymer can be used. Preferably, from about 0.1% to 3% by weight of the aromatic esters, based on the weight of the polymer, are used in the compositions of this invention.

Most polymeric compositions comprise many ingredients such as plasticizers, fillers, pigments and heat stabilizers, and the compounds of this invention can be employed in the compositions in conjunction without any adverse effects. Likewise, the aromatic esters of this invention may be used in conjunction with other known light stabilizers. The ingredients can be intermixed by milling, blending, extrusion or any of the other conventional methods which are well known to those skilled in the art.

The modified polymeric materials of this invention may be molded, extruded, calendered, spread or sprayed. Typical applications for the materials include molded, case or extruded objects, continuous sheetings, tubing, fibers, films, wire coatings, textile coatings, laminates, paints, varnishes and enamels, wood preservatives, adhesives, and caulking compounds.

We claim:

1. A composition comprising a polymer selected from the class consisting of cellulosic polymers, vinyl aromatic hydrocarbon polymers, vinyl carboxylate homopolymers, polyamides, cross-linked polyesters, chlorinated rubber polymers and olefinic hydrocarbon polymers, and from about 0.001% to about 10% by weight, based upon the weight of said polymer, of a compound of the formula,

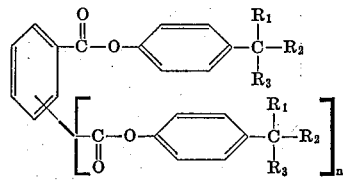

wherein $n$ is an integer from one (1) to two (2), provided that all carboxyl groups are on non-adjacent ring positions; $R_1$, $R_2$ and $R_3$ are alkyl radicals having from one (1) to twenty-one (21) carbon atoms; and the sum of $R_1+R_2+R_3$ is up to twenty-three (23) carbon atoms.

2. A composition comprising an olefinic hydrocarbon polymer and from about 0.001% to about 10% by weight, based upon the weight of said polymer, of a compound of the formula

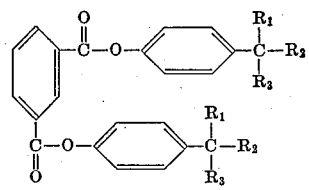

wherein $R_1$, $R_2$ and $R_3$ are alkyl radicals having from one (1) to twenty-one (21) carbon atoms, and the sum of $R_1+R_2+R_3$ is up to twenty-three (23) carbon atoms.

3. A composition as defined in claim 2 wherein said compound is bis 4(1,1,3,3-tetramethylbutyl)phenyl isophthalate.

4. A composition comprising an olefinic hydrocarbon polymer and from about 0.001% to about 10% by weight, based upon the weight of said polymer, of a compound of the formula

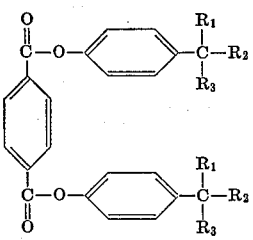

wherein $R_1$, $R_2$ and $R_3$ are alkyl radicals having from one (1) to twenty-one (21) carbon atoms, and the sum of $R_1+R_2+R_3$ is up to twenty-three (23) carbon atoms.

5. A composition as defined in claim 4 wherein said compound is bis 4(1,1,3,3-tetramethylbutyl)phenyl terephthalate.

6. A composition comprising an olefinic hydrocarbon polymer and from about 0.001% to about 10% by weight, based upon the weight of said polymer, of a compound of formula

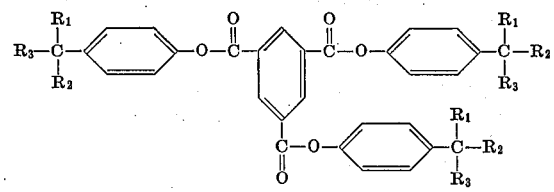

wherein $R_1$, $R_2$ and $R_3$ are alkyl radicals having from one (1) to twenty-one (21) carbon atoms, and the sum of $R_1+R_2+R_3$ is up to twenty-three (23) carbon atoms.

7. A composition comprising an olefinic hydrocarbon polymer and from about 0.001% to about 10% by weight, based upon the weight of said polymer, of a compound of the formula

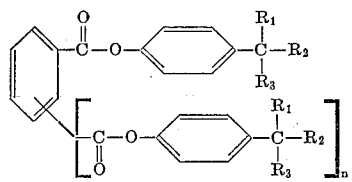

wherein $n$ is an integer from one (1) to two (2), provided that all carboxyl groups are on non-adjacent ring positions; $R_1$, $R_2$ and $R_3$ are alkyl radicals having from one (1) to twenty-one (21) carbon atoms; and the sum of $R_1+R_2+R_3$ is up to twenty-three (23) carbon atoms.

References Cited by the Examiner

UNITED STATES PATENTS

| | | | |
|---|---|---|---|
| 2,529,300 | 11/1950 | Lieber | 252—52 |
| 2,858,293 | 10/1958 | Clark et al. | 260—45.85 |
| 3,080,339 | 3/1963 | Gordon | 260—45.85 |

ALEXANDER H. BRODMERKEL, *Primary Examiner.*

LESLIE H. GASTON, *Examiner.*